(12) United States Patent
Desai

(10) Patent No.: US 7,161,947 B1
(45) Date of Patent: Jan. 9, 2007

(54) METHODS AND APPARATUS FOR INTERCEPTING CONTROL AND DATA CONNECTIONS

(75) Inventor: Arun Raghavendra Desai, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1073 days.

(21) Appl. No.: 10/208,540

(22) Filed: Jul. 30, 2002

(51) Int. Cl.
*H04L 12/28* (2006.01)

(52) U.S. Cl. ........................ 370/401; 370/389; 709/203

(58) Field of Classification Search ...................... None
See application file for complete search history.

(56) References Cited

U.S. PATENT DOCUMENTS

| | | | |
|---|---|---|---|
| 6,138,162 A | 10/2000 | Pistriotto et al. | 709/229 |
| 6,182,141 B1 | 1/2001 | Blum et al. | 709/227 |
| 6,219,669 B1 | 4/2001 | Haff et al. | 707/10 |
| 6,393,487 B1 | 5/2002 | Boucher et al. | 709/238 |
| 6,434,620 B1 | 8/2002 | Boucher et al. | 709/230 |
| 6,473,406 B1 * | 10/2002 | Coile et al. | 370/248 |
| 2002/0078371 A1 * | 6/2002 | Heilig et al. | 713/200 |
| 2006/0020688 A1 * | 1/2006 | Chang et al. | 709/219 |

* cited by examiner

*Primary Examiner*—Duc Ho
(74) *Attorney, Agent, or Firm*—Chapin IP Law, LLC; Barry W. Chapin, Esq.

(57) ABSTRACT

A system provides a proxy connection by intercepting a control connection and a data connection between a client and a server. A proxy device receives a control connection request from a client and establishes a proxy control connection with a server in response to the control connection request from the client. The proxy device then receives a data connection request from the client. In response to the data connection request, the proxy device establishes a data connection with the server at a server-selected or dynamic port of the server and establishes a data connection with the client at a fixed port of the proxy device. Using this technique, the proxy device transparently intercepts both the control connection and the data connection from the client and transmits data received from the server-selected port of the server to the client through the fixed port of the proxy device.

24 Claims, 5 Drawing Sheets

METHODS AND APPARATUS FOR INTERCEPTING CONTROL AND DATA CONNECTIONS

BACKGROUND OF THE INVENTION

Networked computer devices, such as clients and servers, use data transfer protocols in transferring data from one computer device to another. These protocols transfer control traffic and data traffic between a client and server. A client transmits control messages to a server to establish a communications session between the client and server. The server then transmits responses to the client.

In certain protocols, such as HyperText Transfer Protocol (HTTP), the control traffic as well as the data traffic flows over the same connection. Using HTTP, a client negotiates a communications session with a server using Transmission Control Protocol (TCP) and receives data, in the form of the content of a web page, over the same TCP connection.

In other applications, such as File Transfer Protocol (FTP) and Real Time Streaming Protocol/Real-time Transport Protocol (RTSP/RTP), control traffic flows on a control connection between the client and the server while data traffic flows on a data connection between the client and the server. The data connection between the server and the client includes, for example, either a passive-FTP data connection or RTP and RTCP User Datagram Protocol (UDP) traffic from client to server.

During a passive FTP session, a client establishes both a control connection and a data connection to a server. To connect to the server in a passive FTP session, the client opens an FTP control connection to the server's port TCP/21. The client then sends a passive data command to the server. In response, the server opens a passive TCP port on a TCP port selected by the server. Conventionally, the server transmits data traffic through a dynamic (TCP or UDP) port selected by the server (e.g., port numbers greater than 1024 and not well-known Internet Assigned Numbers Authority (IANA) ports). The server instructs the client to connect to the dynamic TCP port and the client opens a data connection to the dynamic port. The client then retrieves data over this data connection.

Conventionally, the client and server computer devices communicate with each other through network devices, such as routers or switches. Certain conventional network devices are enabled with Web Cache Communications Protocol (WCCP), developed by Cisco Systems, Inc. of San Jose, Calif. WCCP specifies interactions between one or more network devices and one or more web-caches such that certain types of traffic flowing through the network device are redirected to a web-cache without any visible effect to an end user (e.g., transparent redirection). For example, when a WCCP enabled network device receives an HTTP request, the network device examines the protocol field and the destination port field in the header of the request. If the protocol field indicates that the request is a TCP request and if the destination port field indicates the destination port is port number 80, the network device forwards the HTTP request to an associated web-cache. Such redirection optimizes resource usage of the network device, thereby reducing transmission costs and lowering response times of the network device.

SUMMARY OF THE INVENTION

As described, during an HTTP connection, the control traffic as well as the data traffic flows over the same connection between the client and the server. Transparent interception of an HTTP connection by a web-cache enabled device, therefore, allows the web-cache enabled device to control both the control traffic and the data traffic through the single connection. Conventional WCCP aware network devices have several disadvantages when intercepting data traffic transmitted on two separate connections between the client and server.

For example, assume that during an FTP connection, a client opens a control connection with a server and the control connection is transparently intercepted by a WCCP enabled network device and directed to a cache or proxy device. The client transmits an FTP data connection request to the server that, in turn, is intercepted by a network device and is transmitted to the proxy device. The server transmits instructions to the client to connect to a server specified TCP port to receive the requested data. The network device and proxy device also intercept these instructions. If the cache forwards the server's response to the client, the client would try to open the data connection to the server's Internet protocol address at the server specified port since the proxy is spoofing the Internet protocol address of the server. The network device, however, cannot intercept the data connection from the client to the server because the server selects the server specified port. In conventional systems, WCCP-aware network devices and proxy devices are configured to intercept certain types of traffic (e.g., traffic intended for a particular port of a device). Therefore, these devices need a static configuration of the server's Internet protocol number and port in order to intercept or hijack ensuing data connections from the client to the server.

Furthermore, even if a transparent proxy device or cache were to inform the client to use a fixed port for data connection traffic, when the cache comes online, previously existing control connection traffic or flows that were not intercepted by the cache could initiate new data connection flows. In turn, these flows would be intercepted by the cache and would be dropped or "black-holed" at the cache.

By contrast, the present invention overcomes such deficiencies and is related to techniques for intercepting a control connection and a data connection between a client and a server. A proxy device establishes a proxy control connection with a server in response to a control connection request from the client. The proxy device establishes a data connection with the server at a port selected by the server in response to a data request from the client. In turn, the proxy device creates a data connection with the client at a fixed port of the proxy device. Using this technique, the proxy device transparently intercepts both the control connection and the data connection from the client and transmits data received from the server-selected port of the server to the client through the fixed port of the proxy device. The proxy device also creates an acceptance criteria based on reception of a control request from the client. The use of the acceptance criteria prevents the proxy device from forming a data connection with a client that transmits a data connection request that is unrelated to an existing communications session handled by the proxy device. The acceptance criteria also allows the proxy device to bypass the data connection request to a network device, thereby preventing the unrelated data requests from interfering with existing proxy connections between the client and the server.

Embodiments of the present invention provide mechanisms and techniques for intercepting a control connection and a data connection between a client and a server. In one embodiment, a proxy device receives a control connection request from a client and establishes a proxy control connection with a server in response to the control connection request. The proxy device establishes a data connection with the server at a server-selected port of the server and a data connection with the client at a fixed port of the proxy device in response to a data connection request from the client. After establishing the data connections, the proxy device transmits to the client, through the fixed port of the proxy device, data received from the server-selected port of the server. This embodiment allows the proxy device to transparently intercept the separate control connection and the data connection between the client and the server.

In another embodiment, the proxy device intercepts data received from the server-selected port of the server, maps the server-selected port of the server with the fixed port of the proxy device, and transmits the data to the client using a fixed port of the proxy device. The use of the fixed port by the proxy device allows the data to be transferred through a network device associated with the proxy device.

In another embodiment of the invention the proxy establishes an acceptance criteria that acts as a condition for establishing a data connection with the client. The proxy device establishes the acceptance criteria, for example, after receiving a control connection request. The acceptance criteria allows the proxy device to actively bypass data connection flows that exist prior to the proxy device's interception of related control connection requests. The acceptance criteria is formed of a 5-tuple including a transmission protocol, a source Internet protocol address, a source port number, a destination Internet protocol address, and a destination port number.

After establishing the acceptance criteria, the proxy device, in one acceptance criteria arrangement, maintains the acceptance criteria in a storage location by creating an entry in a conditional acceptance table. When the proxy device detects termination of the data connection with the server, the device can remove the acceptance criteria from the storage location.

In another acceptance criteria arrangement, the proxy device establishes a data connection with the client based upon the acceptance criteria. By using the acceptance criteria to form data connections, the proxy device actively bypasses data connection flows that exist prior to the proxy device's interception of related control connection requests.

In another acceptance criteria arrangement, when the proxy device establishes the data connection with the client, the proxy device receives a data connection request from the client where the request has a header portion. The proxy device then compares the header portion of the data connection request from the client with the acceptance criteria. If the proxy device detects a correspondence between the header portion of the data connection request and the acceptance criteria, the proxy device create a data connection with the client.

In another acceptance criteria arrangement, the proxy device receives a passive data connection request from the client and establishes a passive data connection with the server. Alternately, the proxy device receives an active connection request from the client and establishes a passive data connection with the server.

Other embodiments of the invention include a computer system, such as a proxy device, computerized device, or other device configured with software and/or circuitry to process and perform all of the method operations noted above and disclosed herein as embodiments of the invention. In such embodiments, the device, such as a proxy device comprises at least one communications interface (e.g., a network interface), a memory (e.g., any type of computer readable medium, storage or memory system), a processor and an interconnection mechanism connecting the communications interface, the processor and the memory. In such embodiments, the memory system is encoded with an interception manager application that when performed on the processor, produces an interception manager process that causes the computer system to perform any and/or all of the method embodiments, steps and operations explained herein as embodiments of the invention. In other words, a computer, switch, router, gateway, network bridge, proxy device or other network device that is programmed or otherwise configured to operate as explained herein is considered an embodiment of the invention.

Other arrangements of embodiments of the invention that are disclosed herein include software programs to perform the method embodiment steps and operations summarized above and disclosed in detail below. As an example, a proxy device software control application, such as a proxy device operating system configured with an interception manager that operates as explained herein is considered an embodiment of the invention. More particularly, a computer program product is disclosed which has a computer-readable medium including computer program logic encoded thereon that, when executed on at least one processor with a computerized device, causes the processor to perform the operations (e.g., the methods) indicated herein is considered an embodiment of the invention. Such embodiments of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system, proxy device or other dedicated or general purpose electronic device to cause such a device to perform the techniques explained herein as embodiments of the invention.

The embodiments of the invention may be implemented by computer software and/or hardware mechanisms within a proxy device or network device apparatus. It is to be understood that the system of the invention can be embodied strictly as a software program, as software and hardware, or as hardware and/or circuitry alone. The features of the invention, as explained herein, may be employed in network devices and other computerized devices and/or software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION OF EMBODIMENTS

The present invention is related to techniques for intercepting a control connection and a data connection between a client and a server. A proxy device establishes a proxy control connection with a server in response to a control connection request from the client. The proxy device establishes a data connection with the server at a port selected by the server in response to a data connection request from the client. In turn, the proxy device creates a data connection with the client at a fixed port of the proxy device. Using this technique, the proxy device transparently intercepts both the control connection and the data connection from the client and transmits data received from the port selected by the server to the client through the fixed port of the proxy device. The proxy device also creates an acceptance criteria based on reception of a control request. The acceptance criteria enables the proxy device to reject data connection requests that are not related to a communications session handled by the proxy device, thereby preventing the unrelated data requests from interfering with existing proxy connections between the client and the server.

Figure 1:
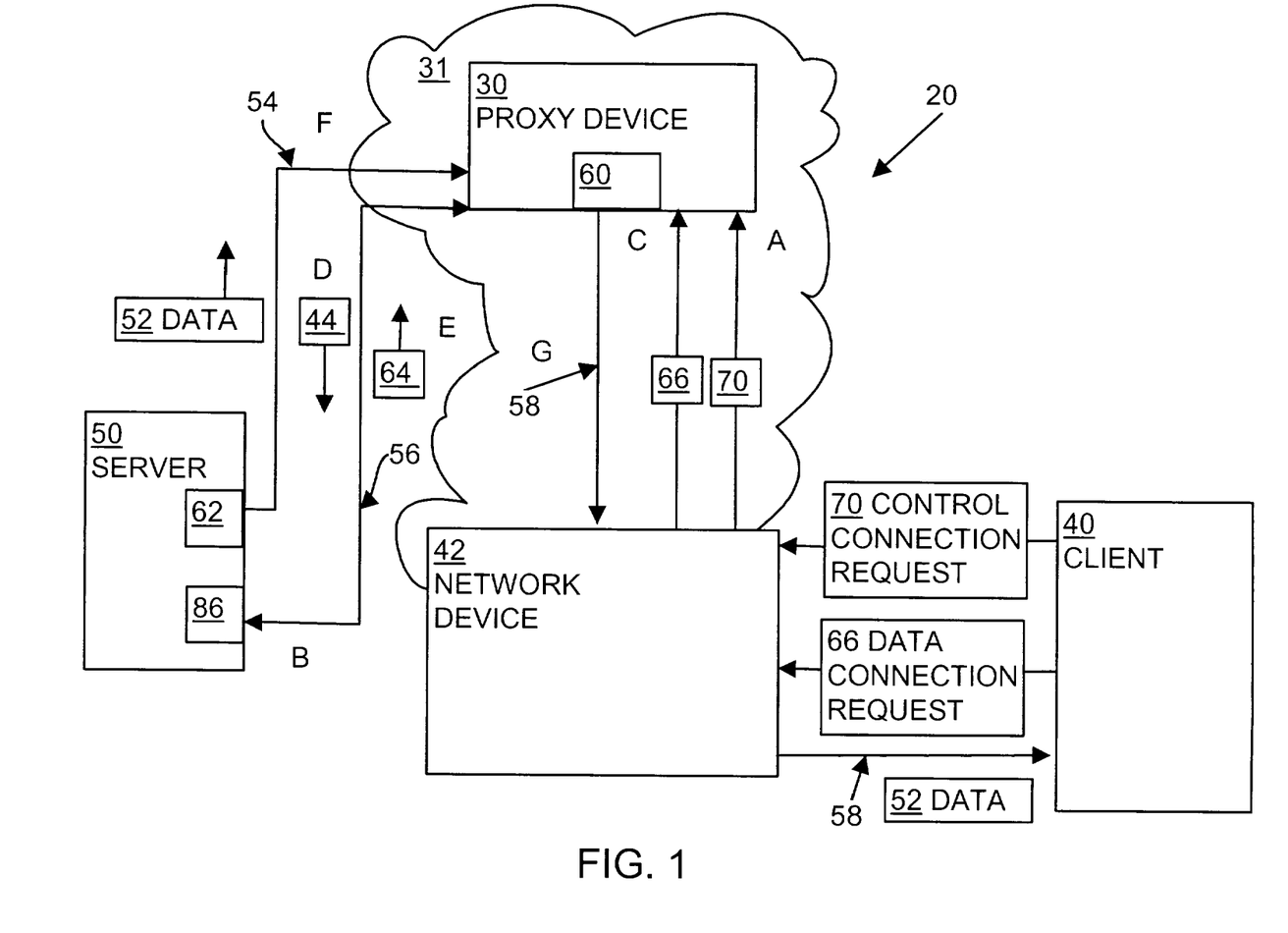
FIG. 1 is a block diagram of a data communications system, configured according to one embodiment of the invention.

FIG. 1 shows a data communications system, given generally as 20, configured to operate according to principles of the present invention. The data communications system 20 includes a first computerized device, such as a client computer 40, a network device 42, a proxy device 30, and a second computerized device, such as a server 50. The client 40 is in communication the server 50 over a network 31 including the network device 42 and the proxy device 30.

In a data communications system 20, port numbers 0 through 1024 (e.g., the values representing particular logical ports) are reserved for specific functions. For example, port number 21 is reserved for FTP communications. In this specification, functional ports are provided in the format: "port number X." For example, reference to a port for FTP traffic is given as "port number 21." Furthermore, in this specification, the physical ports related to the proxy device 30 and the server 50 are provided in the format: "port (Y)." For example, the proxy device 30 has a fixed port (60) and the server 50 has both a fixed port (86) and a dynamic port (62).

The network device 42 can be, for example, a router, switch, proxy server, network bridge, data repeater, protocol converter, or other type of device that can transmit data between other devices (e.g., clients 40 and servers 50) in the system 20. The network device 42 is configured to intercept certain types of traffic. For example, the network device 42 can be configured to intercept a request for a connection to port 21 (for FTP) or port 554 (for RSTP). The network device 42, in one arrangement, is WCCP-enabled such that the network device 42 transparently redirects FTP or RSTP traffic to the proxy device 30. The network 31 can be any type of network, such as the Internet, a local area network, or another type of network. The proxy device 30 can be a content engine, for example, and can provide services such as content caching or content filtering within the system 20.

As illustrated by the example in FIG. 1, during operation of the data communications system 20 during initiation of an FTP communications session, the client 40 transmits a control connection request 70 to a server 50 to open an FTP control connection with the server 50. The network device 42 intercepts the control connection request 70 and, because the network device 42 is WCCP-enabled, the network device 42 forwards the control connection request 70 to the proxy device 30, shown as transaction A in FIG. 1.

After receiving the control connection request 70, and in response to the control connection request 70, the proxy device 30 opens a proxy control connection 56 with server 50, shown as transaction B in FIG. 1. The proxy device 30 establishes the proxy control connection with the server 50 at port (86). In the case where the control connection request 70 relates to an FTP connection request, the proxy device 30 establishes the proxy control connection 56 with the server 50 at port (86) where port (86) is equal to port number 21. In the case where the control connection request 70 relates to an RTSP connection request, the proxy device 30 establishes the proxy control connection 56 with the server 50 at port (86) where port (86) is equal to port number 554.

Next, the client 40 transmits a data connection request 66 to the server 50. The network device 42 also intercepts the data connection request and transmits the request 66 to the proxy device 30, shown as transaction C in FIG. 1. In response to the data connection request 66 from the client, the proxy device 30 transmits a proxy data connection request 44 to the server 50, shown as transaction D in FIG. 1

After receiving the proxy data connection request 44, the server 50 transmits a server-selected or dynamic port number 64 to the proxy device 30, shown as transaction E in FIG. 1. The server 50 selects the server-selected port number as the port (62) for transmission of data 52 to the client 40 and transmits the server-selected port information 64 to the proxy device 30.

The proxy device 30 receives the server-selected port information 64 and establishes a data connection 54 with the server 50 at the server-selected port (62), shown as transaction F in FIG. 1. The proxy device 30 also establishes a data connection 58 with the client 40 at a fixed port (60) of the proxy device 30, shown as transaction G in FIG. 1. By using a fixed port (60) for the data connection between the client 40 and the proxy device 30, the network device 42 can be configured to intercept additional packets pertaining to the data connection request 66 from the client 40 to the server 50. In turn, the network device 42 directs these requests to the proxy device 30. For example, the network device 42 redirects a data connection request 66 to the proxy device 30 when the data connection request 66 has a destination port number equal to the fixed port number of the proxy device 30.

During data transfer between the server 50 and the client 40, the server 50 transfers data 52 through the server-selected port 62 and over the proxy data connection 54 to the proxy device 30. In turn, the proxy device 30 transfers the data 52 through the fixed port (60) and over the client data connection 58 to the client 40.

The system 20, as described in this example, allows applications having separate control and data connections to be transparently intercepted using the proxy device 30.

Figure 2:
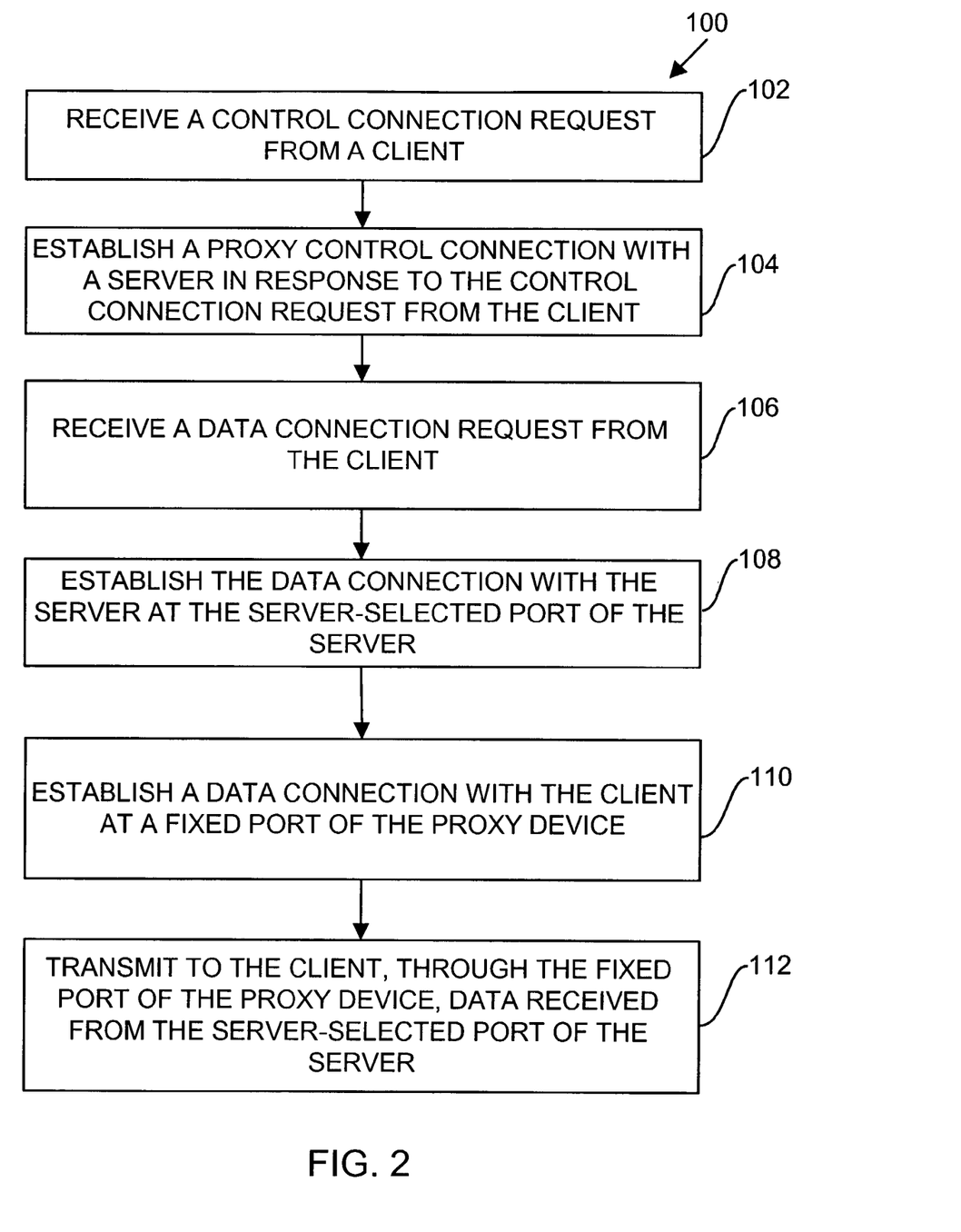
FIG. 2 is a flowchart of a procedure performed by the data communications system of FIG. 1, configured according to one embodiment of the invention.

FIG. 2 illustrates a procedure 100 for intercepting a control connection request and a data connection request from a client 40 to a server 50, according to one embodiment of the invention.

In step 102, the proxy device 30 receives a control connection request 70 from the client 40. In one embodiment, the proxy device 30 receives the connection request 70 from the client 40 by way of the network device 42. In another embodiment, the network device 42 is a WCCP-enabled network device 42 that is configured to direct requests for traffic requiring separate control and data connections to the proxy device 30. For example, the network device 42 can be configured to direct FTP or RTSP control connection requests 70 or RTCP traffic to the proxy device 30.

When the client 40 transmits a control connection request 70 to the server 50 in order to establish a communications session with the server 50, the connection request 66 includes a header portion, such as a 5-tuple for the connection. The 5-tuple includes a protocol type, such as FTP or RSTP, a source or client Internet protocol (IP) address, a client port number, a destination or server IP address, and a server port number. In FTP communications, servers 50 typically receive connection requests on port number 21 whereas in RSTP communications, servers 50 typically receive connection requests on port number 554. Therefore, for an FTP control connection request 66, the server port number located in the header of the control connection request 66 is typically port number 21. The network device 42, therefore, can be configured to intercept all requests directed toward port number 21 and can direct the intercepted control connection requests 70 to the proxy device 30.

In step 104, the proxy device 30 establishes a proxy control connection 56 with the server 50 in response to the control connection requests 70 from the client 40. In one embodiment, when the proxy device 30 interprets a control connection request 70 from the client 40 to the server 50, the proxy device 30 terminates the control connection request 70 at the proxy device 30. The proxy device 30 establishes a proxy control connection 56 with the server 50. In the case of an FTP request, the proxy device 30 forms a proxy control connection 56 with server port number 21. In the case of an RSTP request, the proxy device 30 forms a proxy control connection 56 with server port number 554. By terminating the control connection 70 and establishing the proxy control connection 56 with the server 50, the proxy device 30 acts as a "spoof" between the client 40 and the server 50.

In step 106, the proxy device 30 receives a data connection request 66 from the client 40. As stated, for certain types of applications, such as FTP and RSTP applications, control and data traffic flow on two independent connections. Therefore, the data connection request 66 from the client 40 is an attempt by the client 40 to establish a second or data connection with the server 50. Furthermore, the data connection request 66 also includes a header having the aforementioned 5-tuple. Therefore, the network device 42 can intercept the data connection request 66 and, because the request 66 involves FTP communications and is directed to port 21 of the server 50, transmit the data connection request 66 to the proxy device 30.

During FTP communications between the client 40 and a server 50, the data connection between the client 40 and the server 50 can either be established as a passive data connection or an active data connection. For a passive data connection, the client 40 initiates both the control connection, in the form of a control connection request 70, and the data connection, in the form of a data connection request 66, to the server 50. For an active data connection, the client 40 initiates the control connection, in the form of a control connection request 70, while the server 50 initiates the data connection with the client 40. The server 50 initiates the data connection in response to the active connection request, such as a port command, from the client 40. For example, the client 40 transmits an active connection request to the server 50 by specifying, to the server 50, a port for the data connection.

In step 108, the proxy device 30 establishes a data connection 54 with the server 50 at a server-selected port 62 of the server 50.

The client 40 transmits a data connection request, such as a passive request, to the server 50. The network device 42 intercepts the connection request 66 and transmits the request 66 to the proxy device 30. In response to the data connection request 66 from the client 40, the proxy device 30 transmits a proxy data request 44 to the server 50 in order to establish the data connection 54 with the server 50.

After receiving the proxy data connection request 44, the server 50 transmits a server-selected or dynamic port information 64 to the proxy device 30. In one arrangement, the dynamic port number 64 is transmitted to the proxy device 30 over the proxy control connection 56. The server 50 selects the port number as a value greater than 1024, thereby ensuring that the data connection is not made with an established LANA port. For example, the server-selected port number 64 is port number 5000 on the server 50.

The proxy device 30 then forms a data connection 54 with the server 50 at the server-selected port (62). All data 52 transferred from the server 50 to the client 40 travels through the proxy data connection 54. As described, the data connection 54 between the proxy device 30 and the server 50 is a passive data connection because the proxy device 30 initiates the data connection 54 with the server.

In step 110, the proxy device 30 establishes a data connection 58 with the client 40 at a fixed port (60) of the proxy device 30. The fixed port (60) has a fixed or constant port number for the proxy device 30, thereby allowing the network device 42 to transmit intercepted data connection requests 66 from the client 40 to the proxy device 30. For example, assume that the fixed port (60) has a port number 10,000. The network device 42 can be configured to intercept all data connection requests 66 directed to destination port number 10,000 and forward the requests to the proxy device 30.

In the example above, the fixed port number for the proxy device 30 is port number 10,000. The fixed port number, however, is a value greater than 1024. Alternately, for FTP applications, the proxy device 30 can use the fixed standard FTP data port TCP/20 as the fixed port number.

In one embodiment, prior to establishing the data connection 58 with the client 40 at the fixed port (60), the proxy device 30 maps the server-selected port (62) of the server 50 with the fixed port (60) of the proxy device 30. The mapping process provides a one-to-one correspondence between the ports (62), (60) such that the data 52 transmitted from the server-selected port is transmitted through the fixed port (60) of the proxy device 30.

In establishing the data connection 58 with the client 40, the proxy device 30 instructs the client 40 to form a data connection with the proxy device 30 at the fixed port (60). The proxy device 30 spoofs the Internet protocol address of the server 50 such that the client 40, in response to the instructions from the proxy device 30, attempts to open a data connection with the server 50 by transmitting a data connection request 66 to the server's IP address and the fixed port (60) of the proxy device 30. The network device 42 intercepts the data connection request 66 and transmits the request to the proxy device 30. The proxy device 30, however, does not establish a data connection between the client 40 and the server 50. The proxy device 30, instead, forms a data connection 58 between the proxy device 30 and the client 40.

In step 112, the proxy device 30 transmits data 52 received from the server-selected port (62) of the server 50 to the client 40 through the fixed port (60) of the proxy device 30. Data transfer 52 occurs between the server 50 and the proxy device 30 over the data connection 54 and between the proxy device 30 and the client 40 over the data connection 58.

As described above, a proxy device 30 can transparently intercept both control and data connections for applications that have separate control and data connections. Assume, however, that a control connection for an FTP session between a client 40 and a server 50 exists within a data communications system 20 prior to activation of the proxy device 30. There is a possibility that the subsequent data connection request 66 from the client 40 directed towards the server-selected port 62 can be intercepted by the proxy device 30 when the server-selected port (62) is equal to the fixed port (60) of the proxy device 30 (e.g., server selected port number 10,000 and fixed port number 10,000). In such a case, the proxy device 30 would intercept the subsequent data connection request 66 from the client 40 even though the proxy device 30 had not intercepted the control connection 70 from the client 40. Intercepting the subsequent data request 66 can break the flow of data between the server 50 and the client 40.

Figure 3:
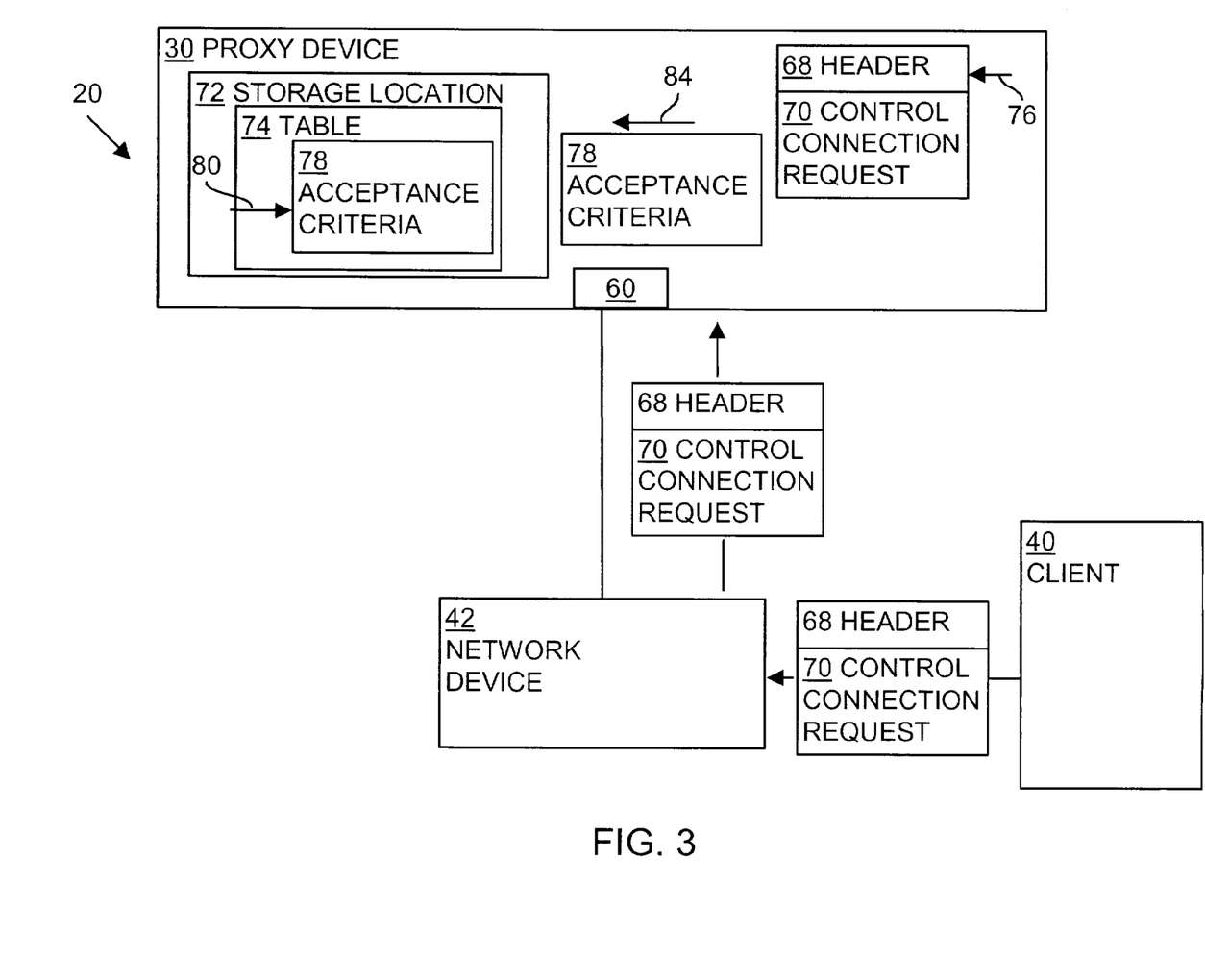
FIG. 3 is a block diagram of the data communications system of FIG. 1, configured according to one embodiment of the invention.

In order to prevent the proxy device from inadvertently intercepting a data connection request 66, the proxy device 30, in one embodiment, is configured to conditionally accept data connection requests 66 from the client 40. In one embodiment, the proxy device performs conditional acceptance of data connection requests 66 by monitoring an acceptance criteria of the data connection request 66. FIG. 3 illustrates an embodiment of the data communications system 20 establishing an acceptance criteria 78 for data connection requests 66.

As shown in FIG. 3, the client 40 transmits a control connection request 70 to the server 50 to initiate an FTP session. In this example, the network device 42 is configured to intercept FTP control connection requests 70. The network device 42 intercepts the control connection request 70 and transmits the request 70 to the proxy device 30.

Each control connection request 70 has a header portion 68 that includes a 5-tuple formed of five separate elements, including a protocol type, such as FTP or RSTP, a source or client Internet protocol (IP) address, a client port number, a destination or server IP address, and a server port number. The 5-tuple is formatted generally as: {protocol, client IP address, client port number, server IP address, server port number}.

The client transmits a control connection request 70 to the server 50 that is intercepted by he network device 42. The proxy device receives the control connection request 70 establishes an acceptance criteria 78 that acts as a condition for establishing the data connection with the client. The acceptance criteria 78 includes information relating to the protocol type of a data request, a source Internet protocol (IP) address for the data request, the source port number for the request, a destination IP address for the request, and a destination port number for the request.

The acceptance criteria 78 is a 5-tuple formatted as: {protocol type, client IP address, *, server IP address, proxy device fixed port number}. In one embodiment, the proxy device 30 creates the acceptance criteria using information from the 5-tuple of the control connection request 70. The first element in the acceptance criteria indicates the transmission protocol for a request. For example, FTP transmissions use TCP as the transmission protocol. Regarding the second and fourth elements in the acceptance criteria 78, the proxy device 30 determines the client IP address and the server IP address from the header portion of the control connection request 70, for example. The third element within the acceptance criteria 78 is a "wildcard" that indicates any source port number can be used within the acceptance criteria 78. The fixed port number is the port number of the proxy device 30.

One example of an acceptance criteria 78 is provided as: {TCP, 1.2.3.4, *, 5.6.7.8, 10,000}. This acceptance criteria 78 defines a TCP connection with a source IP address of 1.2.3.4, any source port number, a destination IP address of 5.6.7.8, and fixed destination (e.g. proxy device) port number 10,000.

The proxy device 30 maintains 84 the acceptance criteria 78 in a storage location 72. The storage location 72, for example, includes any type of computer readable medium, storage, or memory system. In one embodiment, the proxy device 30 stores or maintains 84 the acceptance criteria 78 for later access by creating an entry 80, such as an acceptance criteria entry, in a conditional acceptance table 74. In one arrangement, the proxy device 30 stores the entry 80 within the conditional acceptance table 74 until either the data connection 54 between the proxy device 30 and the server 50 is terminated or the data connection between the proxy 50 and the client 40 is terminated. Upon detection of termination of the data connection 54 by either the server 50 or the client 40, the proxy device 30 removes the acceptance criteria 78 or entry 80 from the storage location 72 or table 74.

Once the proxy device 30 has established the acceptance criteria 78, the device 30 utilizes the acceptance criteria 78 to conditionally accept (e.g., either accept or reject) data connection requests 66 intercepted from the client 40 and thereby establish a data connection with the client 40.

Figure 4:
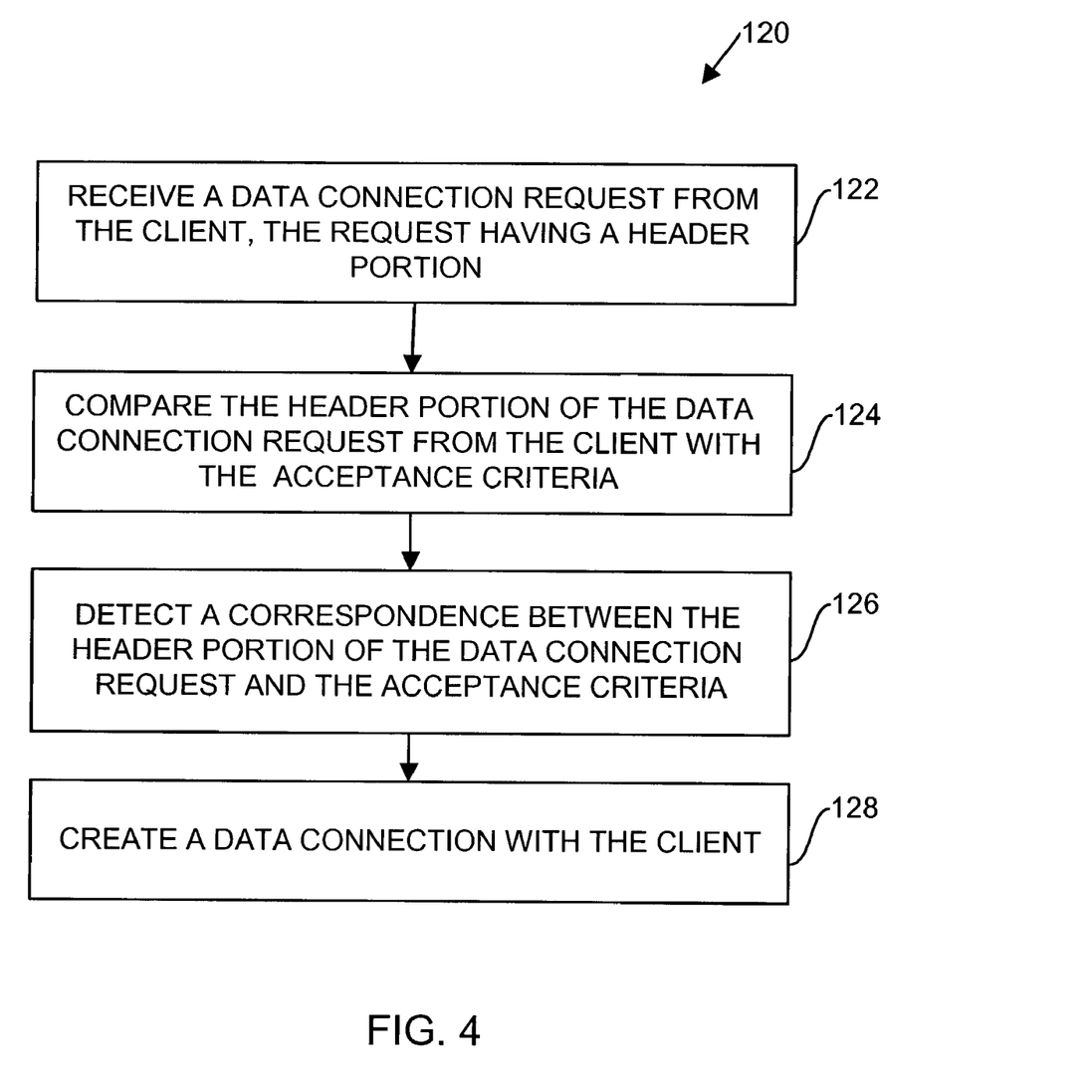
FIG. 4 is a flowchart of a procedure performed by the data communications system of FIG. 1 configured according to one embodiment of the invention.

FIG. 4 illustrates a procedure 120 for establishing a data connection with the client 40 based upon the acceptance criteria 78, according to one embodiment of the invention.

In step 122, the proxy device 30 receives a data connection request 66 from the client 40 where the data connection request 66 includes a header portion. For example, the header portion is formed of the 5-tuple that includes protocol, source IP address, source port number, destination IP address, and server port number information.

In step 124, the proxy device 30 compares the header portion of the data connection request 66 with the acceptance criteria 78. In one embodiment, the proxy device 30 compares the 5-tuple of the header portion with the acceptance criteria 78 to determine whether to accept or reject the data connection request 66. The proxy device 30 accesses the acceptance criteria 78 from the storage location 72 in order to compare the acceptance criteria 78 with the 5-tuple of the header portion of the data connection request 66. For example, assume the acceptance criteria 78 of the proxy device 30 is a 5-tuple having elements {TCP, 1.2.3.4, *, 5.6.7.8, 10,000} and the header portion of the data connection request 66 is a 5-tuple having elements {TCP, 1.2.3.4, 2000, 5.6.7.8, 10,000}. The proxy device 30 then compares each element of the 5-tuple of the data connection request 66 with the 5-tuple of the acceptance criteria 78.

In step 126, the proxy device 30 detects a correspondence between the header portion of the data connection request 66 and the acceptance criteria 78 stored by the proxy device 30.

By comparing each element in the 5-tuple of the data connection request 66 with each respective element of the acceptance criteria 78, the proxy device 30 detects a correspondence between the header of the data connection request 66 and the acceptance criteria 78. For example, the proxy device detects a correspondence between the protocol elements (TCP), the source and destination IP addresses, the source port numbers (e.g., where the wildcard for this element in the acceptance criteria 78 allows any source port number to be used), and the destination port numbers.

In step 128, when the proxy device 30 detects a correspondence between the header portion of the data connection request 66 and the acceptance criteria 78, the proxy device 30 creates a data connection 58 with the client 40. The data connection 58 is made through the fixed port (60) of the proxy device 30. By establishing the connection 58, the proxy device 30 can transmit data 52 from the dynamic port (62) of the server 50 to the client 40.

When the proxy device does not detect a correspondence between the acceptance criteria 78 and the data connection request 66, the proxy device 30 does not create or establish a data connection 58 with the client 30 based on the data connection request 66 from the client 40. The proxy device 30 can fail to detect a correspondence, for example, if there was no entry 80 created in the table 74 corresponding to a particular communication session or control connection request 70. In one arrangement, the proxy device 30 forwards the data connection request 66 to the network device 42. The network device 42, in turn, forwards the data connection request 66 to an appropriate server 50. In this case, the data connection occurs between the client 40 and the server 50 and data traffic 52 from the server 50 flows directly to the client 40, bypassing the proxy device 30 entirely. In an alternate arrangement, if the proxy device does not detect a correspondence between the acceptance criteria 78 and the data connection request 66, the proxy device 30 forwards the data connection request 66 to a second proxy device 66 within the data communications system 20. The second proxy device 66 can therefore forward the data connection request 66 to an appropriate server 50.

The proxy device 30 creates an acceptance criteria 78 for data connection requests 66 of a particular communications session if the proxy device 30 intercepts the control connection request 70 from the client 40. In one embodiment, the control connection request 66 triggers the proxy device 30 to create the acceptance criteria 78. Therefore, upon reception of a subsequent data connection request 66, the proxy device 30 can establish a data connection with the client 40 because the proxy device 30 had created an acceptance criteria 78 for that connection. Without the control connection request 70 to trigger the creation of the acceptance criteria 78, the proxy device 30 does not create the acceptance criteria 78 for subsequent data connection requests 66. Therefore, the proxy device 30 bypasses intercepted data connection requests 66 if the proxy device 30 receives the data connection request 66 without first having received the associated control connection request 70.

In a data communications system 20, there is a possibility that a control connection for a data communications session between a client 40 and a server 50 exists prior to activation of the proxy device 30 within the data communications system 20. In one embodiment, the proxy device 30 bypasses data connection requests 66 from the client 40 to the network device 42 when the proxy device 30 had not initially intercepted either the control connection request 70 from the client 40.

For example, assume the case where the proxy device 30 is activated after a first client 40 and the server 50 establish a control connection and a data connection. Also assume that the proxy device establishes a connection between a second client and the server where the acceptance criteria 78 of the proxy device 30 (e.g., {TCP, 1.2.3.4, *, 5.6.7.8, 10,000}) matches the 5-tuple (e.g., {TCP, 1.2.3.4, 2000, 5.6.7.8, 10,000}) of the existing FTP data connection between the first client and the server 50. Because the destination port of the existing data connection is equal to the port of the proxy device, the network device 42 can intercept the data connection between the first client and the server and transmit the data connection to the proxy device 30. The proxy device 30, however, bypasses the data connection even though the 5-tuple of the data connection matches the 5-tuple of the acceptance criteria because the proxy device 30 had not received a control connection request 70, such as a TCP SYN packet, from the client 40 for that connection. In such a case, the proxy device 30 bypasses the data connection back to the network device 42.

In another example, assume that a single client 40 had transmitted two FTP control connection requests 70 with the same server 50 and that the proxy device 30 is activated after the client 40 transmits the first control connection request but before the client transmits the second control connection request. In such a case, the proxy device 30 intercepts the second control connection request but does not intercept the first control connection request. Also assume that the second control connection request specifies a passive data port number that is different from the fixed port number of the proxy device 30. Because the proxy device 30 intercepted the second control connection request and not the first control connection request, the proxy device 30, in turn, can intercept the data connection request 66 associated with the first control connection request 70 and bypass the data connection request 66 associated with the second control connection request 70.

In another example, assume that a single client 40 had transmitted two FTP control connection requests 70 with the same server 50 and that the proxy device 30 is activated after the client 40 transmits the first control connection request but before the client transmits the second control connection request. In such a case, as described above, the proxy device 30 intercepts the second control connection request but does not intercept the first control connection request. Also, assume that the first data connection request 66 associated with the first control connection request 70 specifies a passive data port number that is equal to the fixed port number of the proxy device 30. In such a case, the 5-tuple of the first data connection request 66 satisfies both the first and second FTP data connections between the client 40 and server 50, The first data connection can therefore be intercepted by the proxy device 30, thereby disrupting the first FTP data session.

In order to avoid such a scenario, for example, the fixed port number of the proxy device 30 can be set equal to TCP/701, a well-known (IANA) port number. As described above, the server 50 selects server-selected port numbers greater than 1024 and cannot select the port number 701 as the server-selected port number. By using 701 as the value of the fixed port number of the proxy device 30, because the server-selected port number can never be equal to 701, a network device 42 cannot intercept the first data connection between the client 40 and the server 50 and forward the data connection to the proxy device 30.

As described above, the data connection 58 between the client 40 and the proxy device 30 is considered a passive connection because the client 40 initiates the data connection request 66. The data connection, however, in an alternate embodiment, is an active connection.

For example, if an FTP client 40 specifies an active connection request, such as a port command, to create an active FTP data connection with a server 50, the proxy device 30 can intercept the active connection request. The proxy device 30, in this embodiment, establishes a passive FTP data connection to the server 50 and establishes an active TCP connection with the client 40. During the data transfer between the server 50 and the client 40, the proxy device 30 receives the data 52 over the passive FTP data connection between the proxy 30 and the server 50, store the data 52 in a storage location of the proxy device 30, such as a local cache, and forward the data 52 to the client 40 over the active TCP connection.

Figure 5:
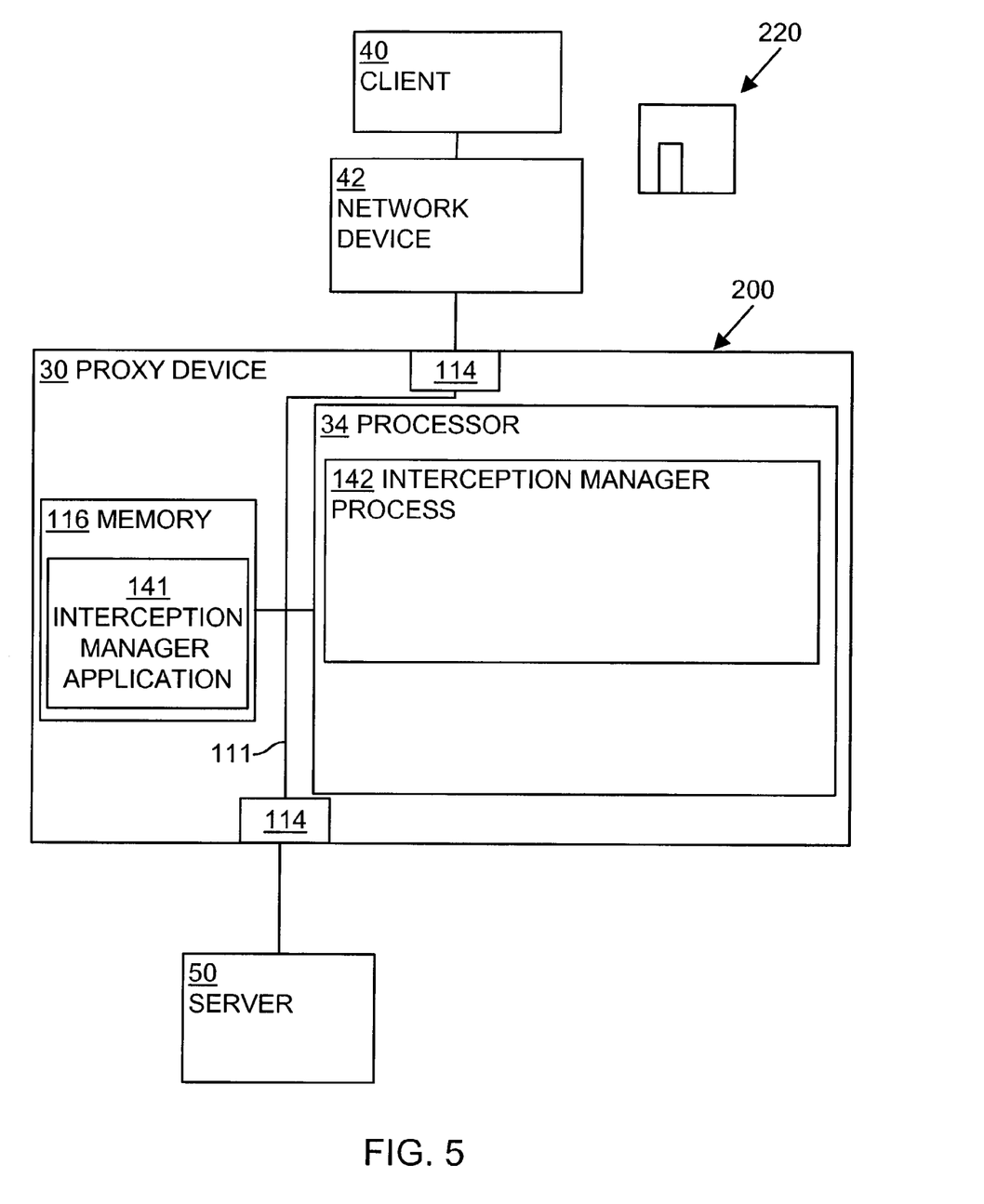
FIG. 5 is a block diagram of a data communications device, configured according to one embodiment of the invention.

FIG. 5 illustrates a more detailed architecture of a proxy device 30 configured according to one embodiment of the invention. FIG. 5 shows a computer device 200, configured to run as a proxy device 30, in one embodiment of the invention. A computer program product 220 includes an application or logic instructions that are loaded into the computer device 200 to configure the device 200 to perform as a proxy device 30.

The proxy device 30, in this example embodiment of the invention, includes an interconnection mechanism 111 such as a data bus and/or other circuitry that interconnects a memory 116, a processor 34 and one or more communications interfaces 114.

The memory 116 may be any type of volatile or non-volatile memory or storage system such as computer memory (e.g., random access memory (RAM), read-only memory (ROM), or other electronic memory), disk memory (e.g., hard disk, floppy disk, optical disk and so forth). The memory 116 is encoded with logic instructions (e.g., software code) and/or data that form a connection interception manager application 141 configured according to embodiments of the invention. In other words, the interception manager application 141 represents software code, instructions and/or data that represent or convey the processing logic steps and operations as explained herein and that reside within memory or storage or within any computer readable medium accessible to the proxy device 30.

The processor 34 represents any type of circuitry or processing device such as a central processing unit, microprocessor or application-specific integrated circuit that can access the interception manager application 141 encoded within the memory 112 over the interconnection mechanism 111 in order to execute, run, interpret, operate or otherwise perform the interception manager application 141 logic instructions. Doing so forms the interception manager process 142. In other words, the interception manager process 142 represents one or more portions of the logic instructions of the interception manager application 141 while being executed or otherwise performed on, by, or in the processor 34 within the proxy device 30. The proxy device 30 in FIG. 1 collectively represents either one or both of the interception manager application 141 and the interception manager process 142.

Those skilled in the art will understand that there can be many variations made to the embodiments explained above while still achieving the same objective of those embodiments and the invention in general. As an example, interception of data and control connections, as described can be applied to web protocols that have multiple connections, such that the primary (e.g. proxy control) connection is always made to a fixed port (e.g. port 21 for FTP requests) and secondary (e.g. data) connection port information is exchanged on the primary (e.g. proxy control) connection.

Additionally, in the examples described above, proxy device 30 interception of FTP communications between the client 40 and server 50 is described. However, the proxy device 30 can also intercept connections between a client 40 and server 50 during RTSP communications.

For example, a client 40 transmits a control connection request 70 to port number 554 of the server to establish an RTSP connection. The network device 42 and proxy device 30, in this example, are configured to intercept RTSP control connection requests 70. In response intercepting the control connection request, the proxy device 30 establishes a control connection 56 and a data (e.g., UDP) connection with the server 50.

In response to a data (e.g., UDP) connection request from the client 40, the proxy device 30 negotiates with the client 40 a first fixed port for RTP traffic and a second fixed port for RTCP traffic. In one embodiment, the port number for the second fixed port is equal to the port number+1 for the first fixed port. For example, if the first fixed port is port number 5,000, the second fixed port is port number 5,001.

All data traffic (RTP and RTCP) flows from the server 50 on the UDP connection between the server 50 and the proxy device 30. The proxy device 30, in turn, forwards all RTP and RTCP traffic to the client 40 on the two separate UDP connections. When the client 40 forwards RTCP/UDP packets towards the server 50, the packets are intercepted by the proxy device 30 because the proxy device had negotiated a second fixed UDP port for RTCP traffic with the client 40 and the network device 42 and the proxy device 30 are configured to intercept UDP packets for that second fixed port.

After receiving the control connection request 66 from the client 40, the proxy device 30 creates an acceptance criteria 78 for the connection request 66 prior to sending out an RTSP setup response to the server 50 in order to establish a control connection with the server 50. Similar to the FTP data connections described above, the use of the acceptance criteria 78 during RTSP communications prevents breaking of existing (non-RTSP-hijacked) RTCP traffic between clients and servers.

In one embodiment, the acceptance criteria 78 is a 5-tuple formatted generally as: {UDP, client IP address, client RTCP port number, server EP address, proxy device second fixed port number}. Because the proxy device 30 detects the client's RTCP port number, there are no wildcards ("*") in the 5-tuple. The proxy device 30 removes the acceptance criteria 78 from a storage location 72 upon receipt of an RTSP teardown command from the server 50 or disconnection of the RTSP TCP connection with the client 40.

Such variations are intended to be covered by the scope of this invention. As such, the foregoing description of embodiments of the invention is not intended to be limiting. Rather, any limitations to the invention are presented in the following claims.

What is claimed is:

1. In a proxy device, a method for intercepting a control connection and a data connection between a client and a server comprising the steps of:
   receiving a control connection request from a client;
   establishing a proxy control connection with a server in response to the control connection request from the client;
   receiving a data connection request from the client;
   establishing a data connection with the server at a server-selected port of the server;

establishing a data connection with the client at a fixed port of the proxy device; and transmitting to the client, through the fixed port of the proxy device, data received from the server-selected port of the server.

2. The method of claim 1 wherein the step of receiving a data connection request from the client comprises the steps of receiving a passive data connection request from the client and establishing a passive data connection with the server.

3. The method of claim 2 wherein the step of receiving the control connection request from the client further comprises establishing an acceptance criteria that acts as a condition for establishing the data connection with the client.

4. The method of claim 3 wherein the step of establishing an acceptance criteria comprises establishing a transmission protocol, a source Internet protocol address, a source port number, a destination Internet protocol address, and a destination port number for the acceptance criteria.

5. The method of claim 3 further comprising the step of maintaining the acceptance criteria in a storage location.

6. The method of claim 5 wherein the step of maintaining comprises creating an entry in a conditional acceptance table.

7. The method of claim 5 further comprising the steps of:
detecting termination of the data connection with the server; and
removing the acceptance criteria from the storage location.

8. The method of claim 3 further comprising the step of establishing a data connection with the client based upon the acceptance criteria.

9. The method of claim 8 wherein the step of establishing a data connection with the client comprises the steps of:
receiving a data connection request from the client, the request having a header portion;
comparing the header portion of the data connection request from the client with the acceptance criteria; and
detecting a correspondence between the header portion of the data connection request and the acceptance criteria.

10. The method of claim 1 further comprising the step of mapping the server selected port of the server with the fixed port of the proxy device.

11. The method of claim 1 wherein the step of receiving a data connection request from the client comprises the steps of receiving an active connection request from the client and establishing a passive data connection with the server.

12. A proxy device comprising:
at least one communications interface;
a processor;
a memory; and
an interconnection mechanism coupling the at least one communications interface, the processor, and the memory;
wherein the proxy device is configured to:
receive a control connection request from a client;
establish a proxy control connection with a server in response to the control connection request from the client;
receive a data connection request from the client;
establish a data connection with the server at a server-selected port of the server;
establish a data connection with the client at a fixed port of the proxy device; and
transmit to the client, through the fixed port of the proxy device, data received from the server-selected port of the server.

13. The proxy device of claim 12 wherein the proxy device, while receiving a data connection request from the client, is configured to receive a passive data connection request from the client and establish a passive data connection with the server.

14. The proxy device of claim 13 wherein the proxy device, while detecting the control connection request from the client, is further configured to establish an acceptance criteria that acts as a condition for establishing the data connection with the client.

15. The proxy device of claim 14 wherein, while establishing an acceptance criteria, the proxy device is configured to establish a transmission protocol, a source Internet protocol address, a source port number, a destination Internet protocol address, and a destination port number for the acceptance criteria.

16. The proxy device of claim 14 wherein the proxy device is further configured to maintain the acceptance criteria in a storage location.

17. The proxy device claim 16 wherein, while maintaining the acceptance criteria in a storage location, the proxy device is further configured to create an entry in a conditional acceptance table.

18. The proxy device claim 16 wherein the proxy device is further configured to:
detect termination of the data connection with the server; and
remove the acceptance criteria from the storage location.

19. The proxy device of claim 14 wherein the proxy device is further configured to establishing a data connection with the client based upon the acceptance criteria.

20. The proxy device of claim 19 wherein the proxy device, while establishing a data connection with the client, is configured to:
receive a data connection request from the client, the request having a header portion;
compare the header portion of the data connection request from the client with the acceptance criteria; and
detect a correspondence between the header portion of the data connection request and the acceptance criteria.

21. The proxy device of claim 12 wherein the proxy device is further configured to map the server selected port of the server with the fixed port of the proxy device.

22. The proxy device of claim 12 wherein the proxy device, while receiving a data connection request from the client, is configured to receive an active connection request from the client to establish an active data connection and establish a passive data connection with the server.

23. A computer program product having a computer-readable medium including computer program logic encoded thereon that, when performed on a processor in a computerized device having a coupling of a memory, a processor, and at least one communications interface provides a method for performing the operations of:
receiving a control connection request from a client;
establishing a proxy control connection with a server in response to the control connection request from the client;
receiving a data connection request from the client;
establishing a data connection with the server at a server-selected port of the server;
establishing a data connection with the client at a fixed port of the proxy device; and
transmitting to the client, through the fixed port of the proxy device, data received from the server-selected port of the server.

24. A proxy device comprising:
at least one communications interface;
a processor;
a memory; and
an interconnection mechanism coupling the at least one communications interface, the processor, and the memory;
wherein the proxy device is configured to produce a means for intercepting a control connection and a data connection between a client and a server, such means including:
means for receiving a control connection request from a client;
means for establishing a proxy control connection with a server in response to the control connection request from the client;
means for receiving a data connection request from the client;
means for establishing a data connection with the server at a server-selected port of the server;
means for establishing a data connection with the client at a fixed port of the proxy device; and
means for transmitting to the client, through the fixed port of the proxy device, data received from the server-selected port of the server.

* * * * *